US011934031B2

(12) United States Patent
Sato

(10) Patent No.: US 11,934,031 B2
(45) Date of Patent: Mar. 19, 2024

(54) LENS APPARATUS AND OPTICAL APPARATUS INCLUDING SAME

(71) Applicant: CANON KABUSHIKI KAISHA, Tokyo (JP)

(72) Inventor: Takehiko Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 16/378,118

(22) Filed: Apr. 8, 2019

(65) Prior Publication Data

US 2019/0310439 A1 Oct. 10, 2019

(30) Foreign Application Priority Data

Apr. 9, 2018 (JP) .................................. 2018-075085

(51) Int. Cl.
*G02B 7/02* (2021.01)
*G03B 17/14* (2021.01)

(52) U.S. Cl.
CPC ............. *G02B 7/026* (2013.01); *G02B 7/023* (2013.01); *G02B 7/025* (2013.01); *G03B 17/14* (2013.01)

(58) Field of Classification Search
CPC ........ G02B 7/026; G02B 7/023; G02B 7/025; G03B 17/14
USPC ........................................................ 359/827
See application file for complete search history.

(56) References Cited

U.S. PATENT DOCUMENTS

| 5,052,781 | A | * | 10/1991 | Iizuka | G02B 7/08 |
| | | | | | 359/823 |
| 5,144,493 | A | * | 9/1992 | Nomura | G02B 7/10 |
| | | | | | 359/700 |
| 5,555,480 | A | * | 9/1996 | Tanaka | G02B 7/026 |
| | | | | | 359/811 |
| 5,905,255 | A | * | 5/1999 | Wakabayashi | G11B 7/0933 |
| | | | | | 369/44.22 |
| 6,094,538 | A | * | 7/2000 | Asayama | G02B 7/28 |
| | | | | | 359/825 |
| 6,640,053 | B1 | | 10/2003 | Dirisio | |
| 7,129,474 | B2 | * | 10/2006 | Kobayashi | G02B 27/62 |
| | | | | | 250/234 |
| 9,829,675 | B2 | | 11/2017 | Fujinaka | |
| 2004/0109243 | A1 | * | 6/2004 | Orimo | G02B 27/62 |
| | | | | | 359/819 |

(Continued)

FOREIGN PATENT DOCUMENTS

CN 100360979 C * 1/2008 ............. G02B 15/02
CN 101918891 A * 12/2010 ............... G03B 5/00

(Continued)

*Primary Examiner* — James R Greece
(74) *Attorney, Agent, or Firm* — Canon U.S.A., Inc., IP Division

(57) ABSTRACT

A lens apparatus includes a lens holding member configured to hold a lens, a base member including an adhesive holding portion opened in an optical axis direction of the lens to hold an adhesive, the base member being provided on an outer periphery side of the lens holding member, an annular member arranged inside the base member to protrude at least in part from an outer peripheral surface of the lens holding member toward an inner peripheral surface of the base member and intersect with the optical axis direction, and a holding member configured to hold the lens holding member, wherein the annular member is held by the lens holding member and the holding member.

9 Claims, 7 Drawing Sheets

(56) References Cited

U.S. PATENT DOCUMENTS

| | | | | |
|---|---|---|---|---|
| 2006/0274430 A1* | 12/2006 | Nomura | ................. | G03B 17/12 |
| | | | | 359/704 |
| 2006/0274435 A1* | 12/2006 | Nomura | ................. | G02B 7/022 |
| | | | | 359/819 |
| 2008/0062518 A1 | 3/2008 | Inoue | | |
| 2011/0317292 A1* | 12/2011 | Kuwano | ................ | H02N 2/001 |
| | | | | 310/317 |
| 2014/0268374 A1* | 9/2014 | Lu | ......................... | G02B 7/025 |
| | | | | 359/819 |

FOREIGN PATENT DOCUMENTS

| | | | | | |
|---|---|---|---|---|---|
| CN | 103513390 | A | * | 1/2014 | ............ G02B 7/023 |
| EP | 2530351 | A1 | * | 12/2012 | ............ F16F 1/373 |
| JP | 2007108596 | A | * | 4/2007 | ............ F16F 1/324 |
| JP | 2010008743 | A | * | 1/2010 | |
| JP | 2010008920 | A | * | 1/2010 | |
| JP | 2017083638 | A | * | 5/2017 | |

\* cited by examiner

LENS APPARATUS AND OPTICAL APPARATUS INCLUDING SAME

BACKGROUND OF THE INVENTION

Field of the Invention

The present disclosure generally relates to a lens apparatus and an optical apparatus including the same.

Description of the Related Art

A lens apparatus discussed in U.S. Pat. No. 9,829,675 is known as a lens apparatus capable of adjusting a position of a lens holding frame that holds a lens. The lens apparatus discussed in U.S. Pat. No. 9,829,675 includes an adhesion plate for suppressing outflow of an adhesive intended to fix the adjusted lens holding frame to a base frame into the interior of the base frame. More specifically, the inflow of the adhesive into the interior of the base frame is suppressed by closing a gap between an eccentric pin provided on the lens holding frame and an eccentric pin adjustment hole formed in the base frame with the foregoing adhesion plate.

The lens apparatus discussed in the foregoing U.S. Pat. No. 9,829,675 can suppress the inflow of the adhesive into the interior of the base frame if the lens apparatus is configured so that the adhesive is applied in a radial direction of the base frame. However, U.S. Pat. No. 9,829,675 does not discuss a configuration capable of suppressing the inflow of the adhesive into the interior of the base frame if the adhesive is applied in an optical axis direction.

SUMMARY OF THE INVENTION

The present disclosure is generally directed to a lens apparatus and more specifically to a lens apparatus capable of suppressing the inflow of the adhesive applied in the optical axis direction into the interior of the lens apparatus, and an optical apparatus including the same.

According to an aspect of the present disclosure, a lens apparatus includes a lens holding member configured to hold a lens unit, a base member including an adhesive holding portion opened in an optical axis direction of the lens unit to hold an adhesive, the base member being provided on an outer periphery side of the lens holding member, an annular member arranged inside the base member to protrude at least in part from an outer peripheral surface of the lens holding member toward an inner peripheral surface of the base member and intersect with the optical axis direction, and a holding member configured to hold the lens holding member, wherein the annular member is held by the lens holding member and the holding member.

Further features of the present disclosure will become apparent from the following description of exemplary embodiments with reference to the attached drawings.

DESCRIPTION OF THE EMBODIMENTS

Figure 7:
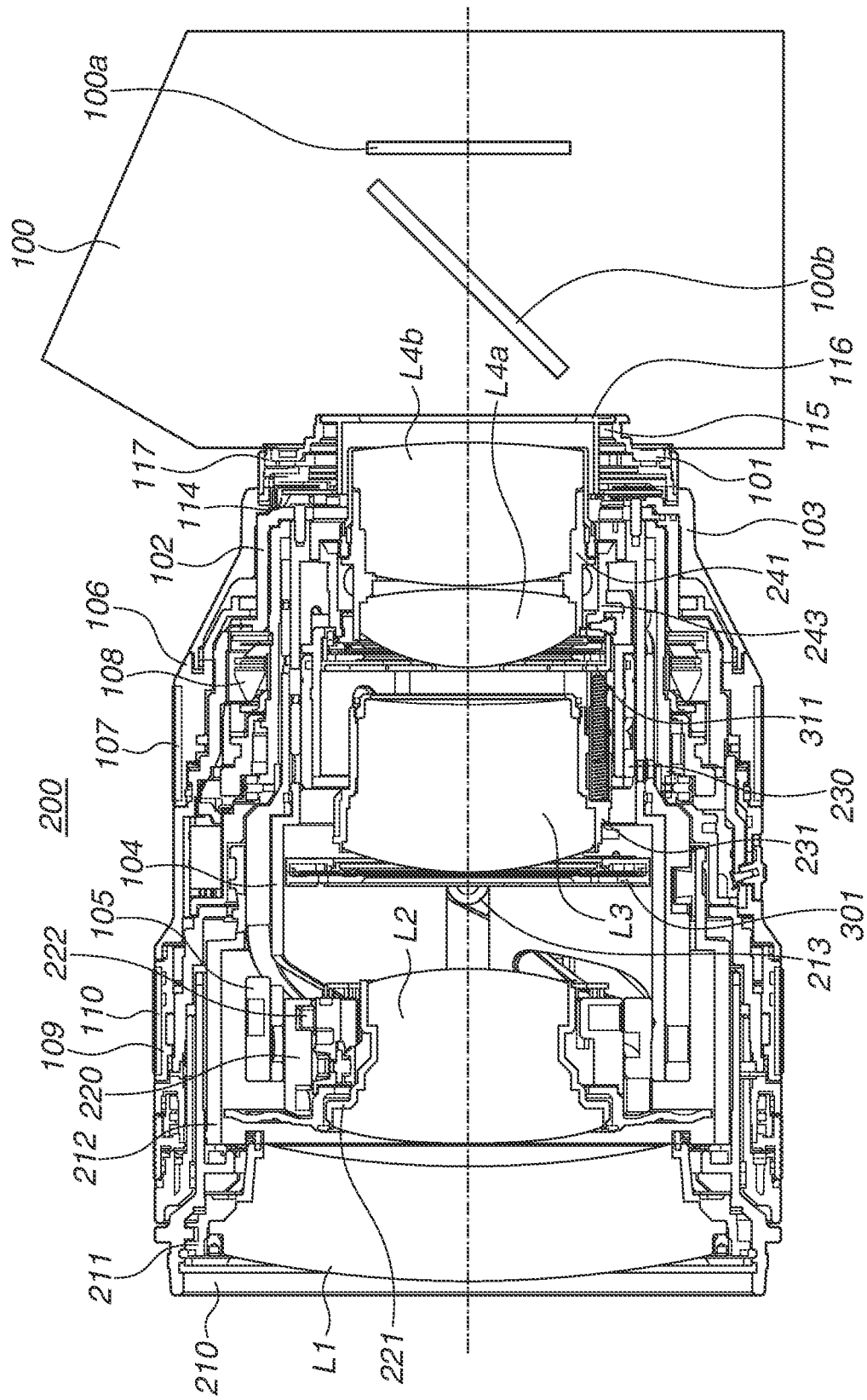
FIG. 7 illustrates a single-lens reflex camera interchangeable lens including a lens holding member biasing structure that is an exemplary embodiment.

A first exemplary embodiment will be described below. A configuration of a camera system (optical apparatus) according to the present exemplary embodiment will be described with reference to FIG. 7. As employed herein, the camera system collectively refers to a lens apparatus 200 and a camera body 100.

(Configuration of Camera Body 100)

The camera body 100 includes an image sensor 100a that receives light from the lens apparatus 200, and a quick return mirror 100b. Examples of the image sensor 100a include a charge-coupled device (CCD) sensor and a complementary metal-oxide-semiconductor (CMOS) sensor. In the present exemplary embodiment, the lens apparatus 200 is detachably attached to the camera body 100. However, the lens apparatus 200 and the camera body 100 may be integrally configured. In other words, the lens apparatus 200 may be an interchangeable lens or a lens apparatus built in an optical apparatus such as a camera system and a projector.

(Configuration of Lens Apparatus 200)

Next, components constituting the lens apparatus 200 will be described.

The lens apparatus 200 includes a first lens unit L1, a second lens unit L2, a third lens unit L3, a fourth-a sub lens unit L4a, and a fourth-b sub lens unit L4b. The plurality of lens units will be referred to collectively as an imaging optical system or a variable magnification optical system.

During zooming, the first lens unit L1, the second lens unit L2, the third lens unit L3, the fourth-a sub lens unit L4a, and the fourth-b sub lens unit L4b move back and forth in an optical axis direction of the imaging optical system or the respective lens units (hereinafter, optical axis direction). As will be described below, the fourth-a sub lens unit L4a and the fourth-b sub lens unit L4b are held by the same member, and move on the same track during zooming. The fourth-a sub lens unit L4a and the fourth-b sub lens unit L4b will be collectively referred to as a fourth lens unit. The first lens unit L1, the second lens unit L2, the third lens unit L3, and the fourth lens unit then move on respectively different tracks during zooming. In other words, the boundaries between the lens units lie within the lens-to-lens distances that vary during zooming.

During focusing, the first lens unit L1, the third lens unit L3, the fourth-a sub lens unit L4a, and the fourth-b sub lens unit L4b do not move, and the second lens unit L2 moves in the optical axis direction.

A mount unit 101 includes a bayonet portion for attaching the lens apparatus 200 to the camera body 100. The mount unit 101 is screwed to a fixed barrel 102. A not-illustrated scale window and a switch (SW) panel are attached to the fixed barrel 102. Automatic focusing and other functions can be selected and used by switching a switch provided on the SW panel.

An exterior ring 103 is sandwiched and fixed between the mount unit 101 and the fixed barrel 102. A guide barrel 104 is screwed to the fixed barrel 102, whereby the position of the guide barrel 104 to the camera body 100 is fixed.

A cam barrel 105 is fitted on the outer periphery of the guide barrel 104. The cam barrel 105 is enabled to only rotate about the optical axis by first group rollers 213, not-illustrated inner cam barrel rollers, third group cam barrel rollers, and fourth group rollers. As the cam barrel 105 rotates, the intersections of guide grooves formed in the guide barrel 104 along the optical axis direction and cam grooves formed in the cam barrel 105 move. The movement of the intersections enables movement of lens holding frames to be described below in the optical axis direction via rollers.

A bayonet portion is provided on the outer periphery of the top end of a filter frame 210 and a screw portion is provided on the inner periphery of the same. Accessories such as a hood and a filter can be attached to the bayonet portion and the screw portion, respectively. A first lens holding frame 211 holding the first lens unit L1 is screwed to the filter frame 210.

Contacting portions of the filter frame 210 and the first lens holding frame 211 are each formed in a circumferentially-extending slope shape. The attachment position of the first lens holding frame 211 to the filter frame 210 in the optical axis direction can thus be selected by rotating and attaching the first lens holding frame 211 to the filter frame 210. This can correct deviations in focal position on the wide-angle side and the telephoto side due to manufacturing errors. The filter frame 210 is screwed to a rectilinear barrel 212. The first group roller 213 is screwed to the rectilinear barrel 212.

A fourth lens holding frame 241 holds the fourth-a sub lens unit L4a and the fourth-b sub lens unit L4b (fourth lens unit). The fourth lens holding frame 241 is held by a fourth lens unit base frame (base member) 243 via fourth lens unit parallel adjustment rollers 245 and fourth group tilt adjustment rollers 246.

Fourth lens unit rollers 244 illustrated in FIG. 1 to be described below are screwed to the base frame 243. The rollers 244 are engaged with guide grooves formed in the guide barrel 104 along the optical axis direction and cam grooves formed in the cam barrel 105. As the cam barrel 105 rotates with respect to the guide barrel 104, the intersections of the guide grooves and the cam grooves move, and the rollers 244 move in the optical axis direction. This moves the fourth-a sub lens unit L4a and the fourth-b sub lens unit L4b integrally with the base frame 243 in the optical axis direction.

A sub diaphragm 311 intended to determine an open aperture diameter and cut off harmful light is elastically coupled to the inner peripheral side of the base frame 243 in front of the fourth lens holding frame (lens holding member) 241. A third lens unit cam barrel 230 is fitted on the outer periphery of the base frame 243. The cam barrel 230 is enabled to only rotate about the optical axis by not-illustrated third lens unit cam barrel rollers. The third lens unit cam barrel rollers are screwed to the cam barrel 230. The cam barrel rollers are engaged with rectilinear grooves formed in the cam barrel 105.

Not-illustrated third lens unit rollers are screwed to a third lens holding frame 231 holding the third lens unit L3. The third lens unit rollers are engaged with guide grooves formed in the base frame 243 along the optical axis direction and cam grooves formed in the cam barrel 230. As the cam barrel 230 rotates with respect to the base frame 243, the intersections of the guide grooves and the cam grooves move, and the foregoing third lens unit rollers move in the optical axis direction. This changes the distance from the fourth-a sub lens unit L4a and the fourth-b sub lens unit L4b held by the base frame 243 to the third lens unit L3 held by the third lens holding frame 231.

As the cam barrel 105 rotates with respect to the guide barrel 104, the base frame 243 and the cam barrel 230 move in the optical axis direction. This moves the third lens holding frame 231 held by the base frame 243 and the cam barrel 230 via the foregoing third lens unit rollers in the optical axis direction, whereby the third lens unit L3 can also be moved in the optical axis direction. An electromagnetic diaphragm unit 301 including a diaphragm driving unit and a diaphragm blade unit is screwed in front of the third lens holding frame 231.

A bayonet-shaped member is engaged with a groove circumferentially formed in a zoom operation ring 106. This enables the zoom operation ring 106 to only rotate about the optical axis, with movement in the optical axis direction regulated. A zoom rubber member 107 is wound around the outer periphery of the zoom operation ring 106. A not-illustrated zoom key is screwed to the inner periphery of the zoom operation ring 106. The zoom key is engaged with a recess formed in the cam barrel 105. The cam barrel 105 can thus be rotated integrally with the zoom operation ring 106 via the zoom key.

A not-illustrated zoom brush screwed to the zoom operation ring 106 slides over a gray code pattern on an encoder flexible substrate. The zoom brush is used to detect a positional relationship between the zoom operation ring 106 and the encoder flexible substrate.

A focus unit 108 is screwed to the guide barrel 104. The focus unit 108 mainly includes a vibration motor and an actuation mechanism. The focus unit 108 outputs the rotation amount of a not-illustrated focus key based on a rotor rotation amount of the vibration motor and the rotation amount of a focus operation ring 109. A focus rubber member 110 is wound around the outer periphery of the focus operation ring 109.

A not-illustrated scale substrate is pasted to the inner periphery of an arc-shaped extension portion extended from the focus unit 108. A not-illustrated position detection sensor arranged opposite to the scale substrate detects the rotation amount of the focus key by a focus operation. A protrusion is further provided on the outer periphery of the focus unit 108 across phases where the encoder flexible substrate is not provided. A not-illustrated roller is screwed to the protrusion.

Not-illustrated inner cam barrel rollers are screwed to an inner cam barrel 220. The inner cam barrel rollers are engaged with cam grooves formed in the guide barrel 104 and optical axis-direction grooves formed in the cam barrel 105. The inner cam barrel 220 thus moves back and forth in the optical axis direction while rotating integrally with the cam barrel 105.

Second lens unit cam followers 222 are attached to the outer periphery of a second lens holding frame 221 holding the second lens unit L2. The second lens unit cam followers 222 are engaged with cam grooves formed in the inner periphery of the inner cam barrel 220. A not-illustrated focus key engagement configuration extended from the second lens holding frame 221 is engaged with the focus key for integral rotation.

As the cam barrel 105 rotates (with the focus key stopped), the second lens holding frame 221 moves back or forth in the optical axis direction as much as the sum of the amount of movement of the inner cam barrel 220 in the optical axis direction and the amount of change of the engagement points in the optical axis direction due to the rotation of the cam grooves of the inner cam barrel 220. As the focus key rotates (with the cam barrel 105 stopped), the second lens holding frame 221 rotates and moves back or forth based on the amount of change of the engagement points with the cam grooves of the inner cam barrel 220 in the optical axis direction.

Using such a mechanism, the lens apparatus 200 mechanically corrects deviations in focal position due to a change in focal length in an inner focusing system by moving the second lens unit L2 back and forth in the optical axis direction.

A main substrate 114 is electrically connected to the focus unit 108, the electromagnetic diaphragm unit 301, and the encoder flexible substrate via a flexible substrate or directly, and performs various controls. A contact block 115 is screwed to the mount unit 101 and connected to the main substrate 114 via a flexible substrate. The contact block 115 is provided for communication with the camera body 100 and for power supply. A back lid 116 is elastically coupled with the mount unit 101 to cut off harmful light. A protection rubber ring 117 is elastically coupled with the mount unit 101.

In the lens apparatus 200 that is an interchangeable lens configured as described above, the rotation of the zoom operation ring 106 rotates the cam barrel 105 via the zoom key, and all the lenses are moved by the foregoing mechanism back and forth in the optical axis direction for variable magnification (zooming) operation. Here, the cam barrel 230 moves back and forth in the optical axis direction integrally with the base frame 243. The not-illustrated third lens unit cam barrel rollers screwed to the cam barrel 230 move along the cam grooves formed in the guide barrel 104 and thereby rotate about the optical axis with respect to the base frame 243. This drives the third lens holding frame 231 holding the third lens unit L3 in the optical axis direction. A not-illustrated sub diaphragm roller is provided on the sub diaphragm 311 and engaged with a cam groove formed in the guide barrel 104. As the base frame 243 moves back and forth in the optical axis direction, the sub diaphragm roller is driven to perform an opening-closing operation.

During automatic focusing, the vibration motor is driven to rotate the focus key. During manual focusing, the focus operation ring 109 is rotated to rotate the focus key. The foregoing mechanism can thus move the second lens unit L2 back and forth for focusing.

(Fourth Lens Unit Adjustment and Fixing Structure)

Next, a fourth lens unit holding structure capable of adjustment and fixing according to the present exemplary embodiment will be described with reference to FIGS. 1 to 4.

Figure 1:
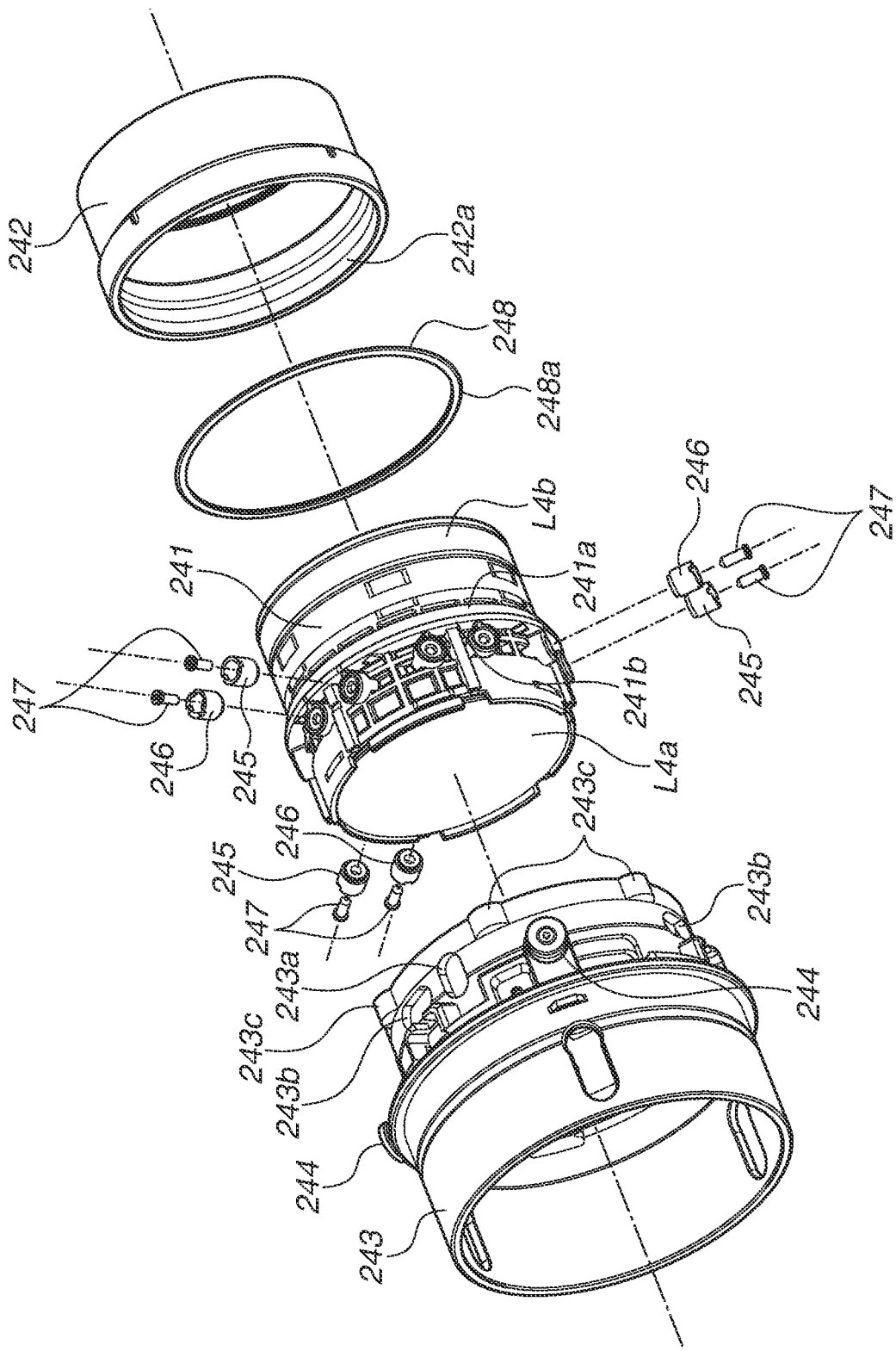
FIG. 1 is an exploded perspective view of a fourth lens unit holding structure according to a first exemplary embodiment.

FIG. 1 is an exploded perspective view of the fourth lens unit holding structure according to the present exemplary embodiment. As employed herein, the fourth lens unit holding structure collectively refers to the components illustrated in FIG. 1. The fourth-a sub lens unit L4a is inserted into the fourth lens holding frame 241 from the front in the optical axis direction and held by caulking the fourth lens holding frame 241. The fourth-b sub lens unit L4b is inserted into the fourth lens holding frame 241 from behind in the optical axis direction and held by a fourth lens unit retaining ring 242.

A retaining ring fixing female screw 242a is formed in the retaining ring 242. The retaining ring 242 is fixed by coupling the retaining ring fixing female screw 242a with a retaining ring fixing male screw 241a provided on the fourth lens holding frame 241. A washer (annular member) 248 serving as a blocking member is held between a washer holding configuration 241b provided on the fourth lens holding frame 241 and the retaining ring 242.

Three fourth lens unit parallel adjustment rollers 245 are fixed to the fourth lens holding frame 241 by screws 247 at intervals of approximately 120° about the optical axis. Three fourth lens unit tilt adjustment rollers 246 are also fixed to the fourth lens holding frame 241 by screws 247 at intervals of approximately 120° about the optical axis.

The parallel adjustment rollers 245 and the tilt adjustment rollers 246 each include a cylindrical unit eccentric to the center axis of the screw 247 by which the roller is fixed to the fourth lens holding frame 241. The cylindrical units are engaged with respective fourth lens unit base parallel adjustment roller holes 243a and fourth lens unit base tilt adjustment roller holes 243b formed in the base frame 243.

Rotating the parallel adjustment rollers 245 and the tilt adjustment rollers 246 about the center axes of the respective screws 247 changes the axial position of the fourth lens holding frame 241 with respect to the base frame 243. Since a relative position of the fourth lens holding frame 241 with respect to the base frame 243 changes, the fourth-a sub lens unit L4a and the fourth-b sub lens unit L4b change in position in the forward-and-backward optical axis direction, an eccentric direction, and a tilt direction.

With such a configuration, optical adjustments can be made to correct positional deviations in the optical axis direction and optical axis deviations occurring in the fourth lens unit due to manufacturing errors. In other words, the lens apparatus 200 includes an adjustment unit for adjusting a relative position and/or orientation of the fourth lens holding frame 241 with respect to the base frame 243. In the present exemplary embodiment, the adjustment unit includes the parallel adjustment rollers 245, the tilt adjustment rollers 246, the base parallel adjustment roller holes 243a, and the base tilt adjustment roller holes 243b.

(Fourth Lens Unit Adhesion Fixing Structure)

In an assembly process of the lens apparatus 200, an adhesive is applied to fourth lens unit base adhesion reservoirs (adhesive holding portions) 243c formed in the base frame 243 after the foregoing optical adjustments. The fourth lens unit retaining ring 242, the washer (annular member) 248, and the base frame 243 are bonded by the adhesive. This can suppress displacement of the fourth lens holding frame 241 from the base frame 243 due to impact or vibrations. Suitable examples of the adhesive include an ultraviolet curing adhesive, an epoxy adhesive, and an acrylic adhesive.

(Configuration For Suppressing Inflow of Adhesive Into Interior of Lens Apparatus)

Figure 2:
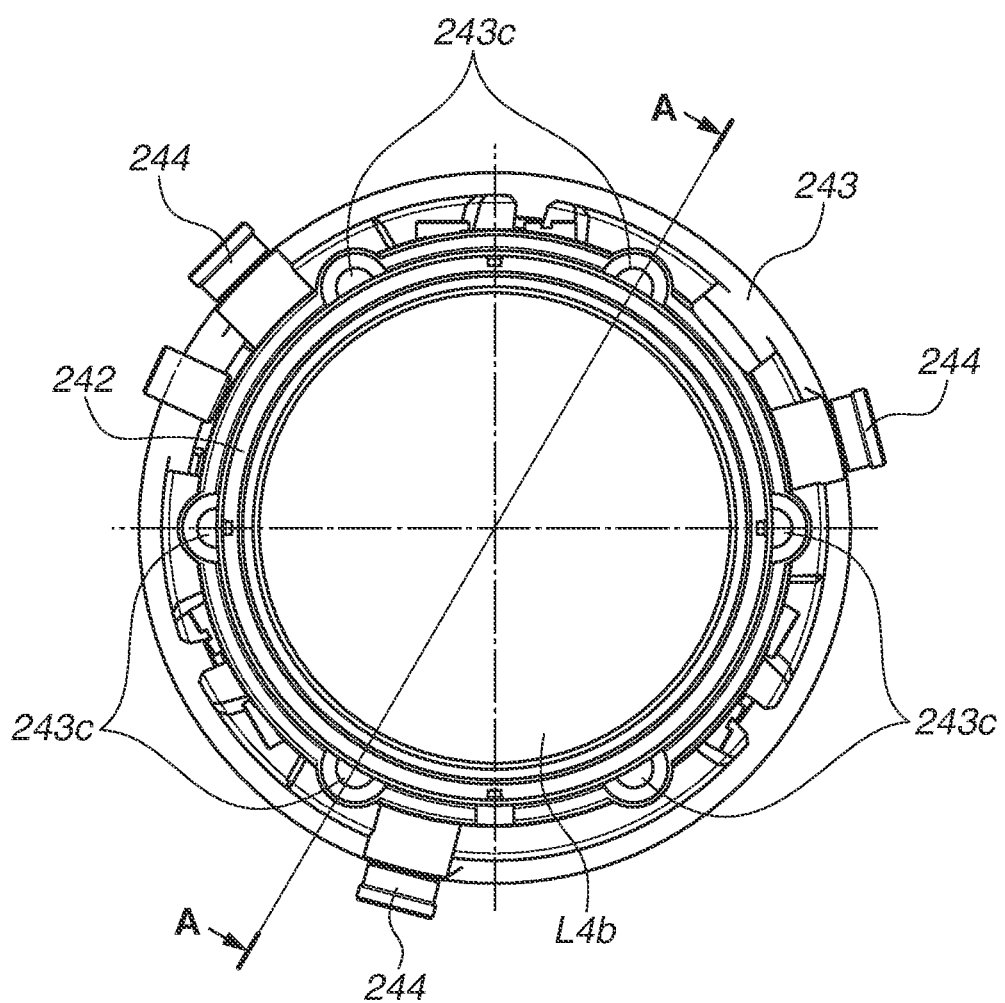
FIG. 2 is a diagram illustrating the fourth lens unit holding structure according to the first exemplary embodiment as seen from behind in an optical axis direction.
Figure 3:
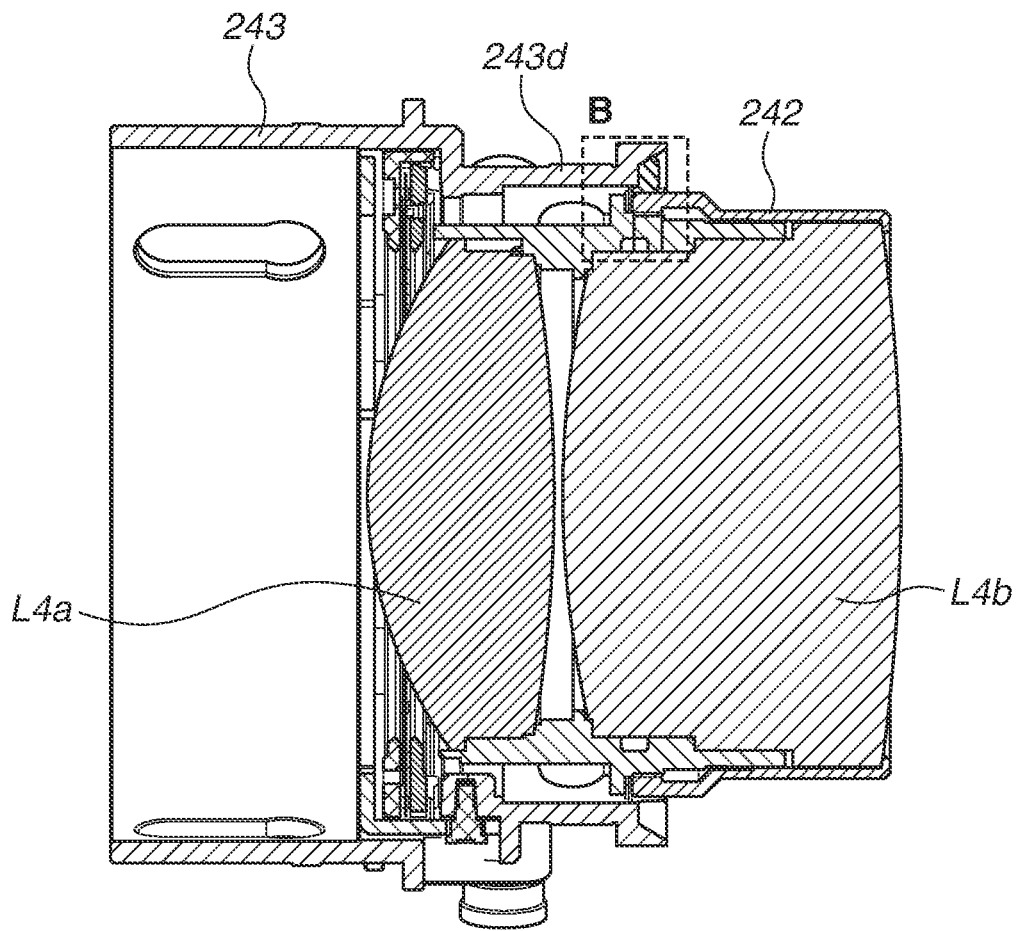
FIG. 3 is a sectional view taken along the line A-A illustrated in FIG. 2.
Figure 4:
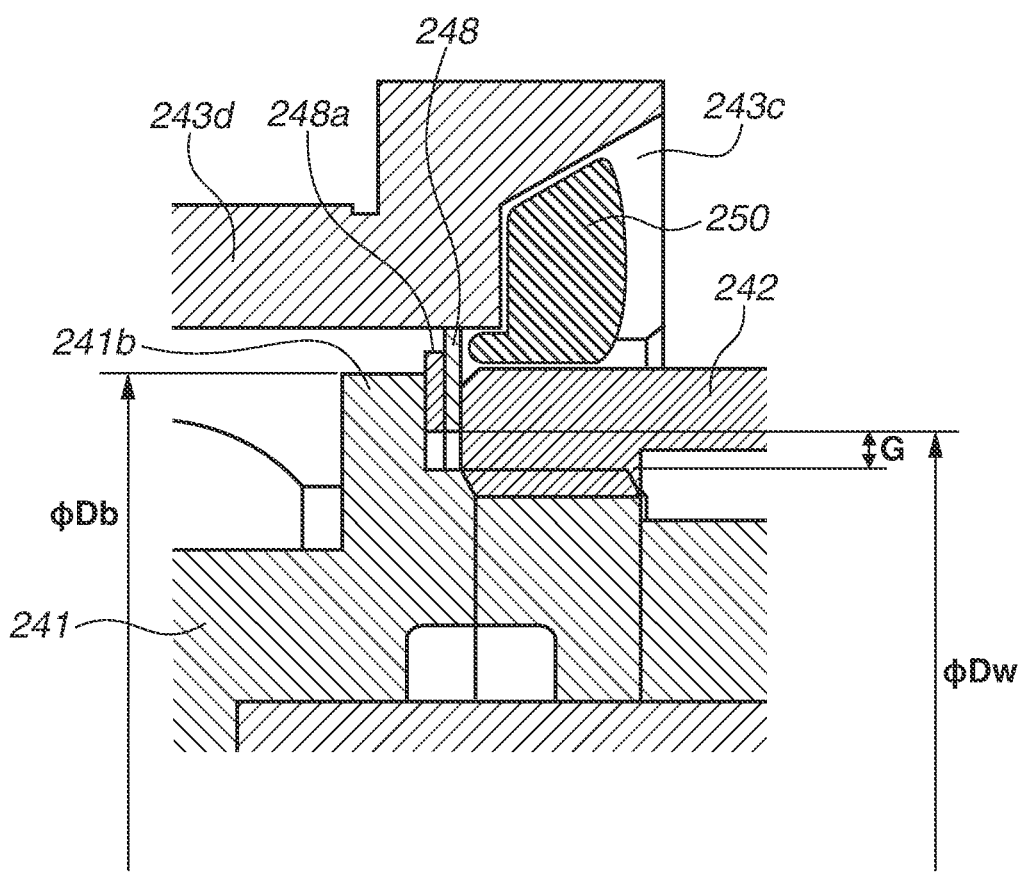
FIG. 4 is an enlarged view of the area B illustrated in FIG. 3.

As illustrated in FIG. 4, the foregoing washer 248 is arranged inside the base frame 243 so that at least part of the washer 248 protrudes from the outer peripheral surface of the fourth lens holding frame 241 toward the inner peripheral surface of the base frame 243. When seen in the optical axis direction, part of the washer 248 overlaps with part of the fourth lens holding frame 241. FIG. 4 is an enlarged view of the area B illustrated in FIG. 3. FIG. 3 is part of a sectional view of the lens apparatus 200 taken along the line A-A illustrated in FIG. 2. FIG. 2 is a view of the fourth lens unit holding structure illustrated in FIG. 1 from behind in the optical axis direction. Six base adhesion reservoirs 243c are formed in the base frame 243 at intervals of approximately 60° about the optical axis. Although not illustrated in FIG. 2, the center axes of the fourth lens holding frame 241 and a base cylinder portion 243d coincide with each other.

The outer peripheral surface of the fourth lens holding frame 241 refers to the side surface of the washer holding configuration 241b in FIG. 4. As will be described below, in the present exemplary embodiment, the outer peripheral surface of the washer 248 is in contact with the inner peripheral surface of the base frame 243. However, the outer peripheral surface of the washer 248 may be configured to partially contact the inner peripheral surface of the base frame 243. The outer peripheral surface of the washer 248 may be configured not to contact the inner peripheral surface of the base frame 243 if the inflow of the adhesive can be suppressed to a small amount.

As illustrated in FIGS. 1 and 4, the washer 248 is arranged inside the base frame 243 to intersect with the optical axis direction such that the washer 248 is arranged so that its radial direction intersects with the optical axis direction. In the present exemplary embodiment, the washer 248 is arranged to be orthogonal to the optical axis direction, whereas the washer 248 does not need to be completely orthogonal to the optical axis direction.

As illustrated in FIG. 4, the base adhesion reservoirs 243c are opened in the optical axis direction of the fourth lens unit. In the present exemplary embodiment, an adhesive 250 is then supplied (applied) to the base adhesion reservoirs 243c in the optical axis direction. Without the washer 248, the adhesive 250 would flow into the interior of the base frame 243.

In the present exemplary embodiment, the washer 248 is arranged inside the base frame 243 as described above so that the washer 248 functions as a blocking member for holding back the adhesive 250. As a result, the inflow of the adhesive 250 applied in the optical axis direction into the interior of the lens apparatus 200 is suppressed.

If the adhesive 250 flows into the interior of the lens apparatus 200 or the interior of the base frame 243, the adhesive 250 can adhere to a portion where the adhesive 250 is not supposed to be applied, for example, between a movable member and a member holding the movable member. This can cause a malfunction of the actuation mechanism of the lens apparatus 200 or a drop in optical performance. If there is no washer 248 or if the washer 248 is configured not to protrude from the outer peripheral surface of the fourth lens holding frame 241 toward the inner peripheral surface of the base frame 243 at least in part the gap between the outer peripheral surface of the fourth lens holding frame 241 and the inner peripheral surface of the base frame 243 is not filled. Through the gap, a needless light beam can reach the image sensor to cause a needless ghost and lower the photographic quality.

In the present exemplary embodiment, the inflow of the adhesive 250 can be suppressed as described above, and the occurrence of a needless ghost can also be suppressed.

(Desirable Configuration)

As describe above, to bond the fourth lens holding frame 241 to suppress a deviation in relative position after optical adjustments are made to locate the fourth lens holding frame 241 at a desired position, the adhesive 250 is applied to the base adhesion reservoirs 243c. The base frame 243, the washer 248, and the retaining ring 242 are thereby bonded.

In the present exemplary embodiment, as illustrated in FIG. 4, the (entire) outer peripheral surface of the washer 248 is in contact with the inner peripheral surface of the base cylinder portion 243d of the base frame 243. In other words, the inner diameter of the base cylinder portion 243d fits with the outer diameter of the washer 248. Among the surfaces of the washer 248, a surface on the side of the retaining ring 242 is in contact with the retaining ring 242. In other words, part of the washer 248 and part of the retaining ring 242 overlap when seen in the optical axis direction. The inflow of the adhesive 250 into the interior of the lens apparatus 200 can thereby be sufficiently suppressed.

Suppose that the fourth lens holding frame 241 is moved with respect to the base frame 243 in the optical axis direction by an optical adjustment. In such a case, the washer 248 held by the fourth lens holding frame 241 and the retaining ring 242 also moves. As described above, in the present exemplary embodiment, the outer diameter of the washer 248 fits with the inner diameter of the base cylinder portion 243d. The gap can thus be kept closed even if the position of the fourth lens holding frame 241 in the optical axis direction is adjusted.

Suppose that the fourth lens holding frame 241 is moved with respect to the base frame 243 in a direction orthogonal to the optical axis or moved to tilt with respect to the optical axis direction by an optical adjustment. In such a case, the washer 248 held by the fourth lens holding frame 241 and the retaining ring 242 also moves. In the present exemplary embodiment, the outer diameter of the washer 248 fits with the inner diameter of the base cylinder portion 243d. The gap can thereby be kept closed even if the position or orientation of the fourth lens holding frame 241 in the direction orthogonal to the optical axis is adjusted.

In the present exemplary embodiment, the adhesive 250 is an ultraviolet curing adhesive. The adhesive 250 applied to the base adhesion reservoirs 243c is irradiated and cured with ultraviolet rays from behind in the optical axis direction (from the right in FIG. 4). In the present exemplary embodiment, as described above, the outer peripheral surface of the washer 248 is in contact with the inner peripheral surface of the base frame 243. This can suppress the spreading of the adhesive 250, for example, to behind the washer 248 (in front in the optical axis direction or to the left in FIG. 4), from reaching a position shielded from the ultraviolet rays.

As illustrated in FIG. 4, an elastically deformable washer biasing member (biasing member) 248a is attached in front of the washer 248 in the optical axis direction. The washer biasing member 248a is a sponge, and is compressed in the optical axis direction by the fixing of the retaining ring 242 to the fourth lens holding frame 241. The washer 248 and the washer biasing member 248a are held by the fourth lens holding frame 241 and the retaining ring 242.

As a result, the washer biasing member 248a biases the washer 248 toward the retaining ring 242. The movement of the washer 248 in the optical axis direction is thus suppressed with the washer 248 in contact with the retaining ring 242, whereby the washer 248 can be stably held.

As illustrated in FIG. 4, there is a gap G between the inner diameter (inner peripheral surface or inner peripheral portion) of the washer 248 and the outer diameter (outer peripheral surface or outer peripheral portion) of the fourth lens holding frame 241 in the radial direction of the fourth lens holding frame 241. By the foregoing optical adjustments, the fourth lens holding frame 241 can be moved within the plane orthogonal to the optical axis direction. If the gap G is too small, the amount of optical adjustment can be limited due to a too small inner diameter of the washer 248. In the present exemplary embodiment, the inner diameter of the washer 248 is then set to satisfy the following conditions.

Suppose that a maximum amount of adjustment to the position of the fourth lens holding frame 241 by the adjustment unit is Rmax. More specifically, the maximum amount of movement (maximum amount of adjustment) of the fourth lens holding frame 241 with respect to the base frame 243 on a plane orthogonal to the optical axis direction by the foregoing optical adjustments is assumed to be Rmax. The lens apparatus 200 is then configured to satisfy:

$$R\text{max} \leq G. \quad (1)$$

If the inner diameter of the washer 248 is set to satisfy Exp. (1), the components can be prevented from interfering with each other to limit the amount of optical adjustment even if the fourth lens holding frame 241 is moved by Rmax with respect to the base frame 243.

The lens apparatus 200 is also configured to satisfy:

$$Dw + 2 \times R\text{max} < Db, \quad (2)$$

where Db is the outermost diameter of the fourth lens holding frame 241, and Dw is the inner diameter of the washer 248. The lens apparatus 200 satisfies Exp. (2) in addition to the foregoing Exp. (1). When seen from behind in the optical axis direction, the inner peripheral surface of the washer 248 is thus prevented from being located outside the outer peripheral surface of the fourth lens holding frame 241 even with the maximum amount of optical adjustment. In other words, even if the maximum amount of optical adjustment is made, part of the washer 248 and the fourth lens holding frame 241 overlap when seen in the optical axis direction.

A configuration of a lens apparatus according to a second exemplary embodiment of the present disclosure will be described with reference to FIGS. 5 and 6. In the present exemplary embodiment, a washer 448 is provided instead of the washer 248 and the washer biasing member 248a according to the foregoing first exemplary embodiment.

Figure 5:
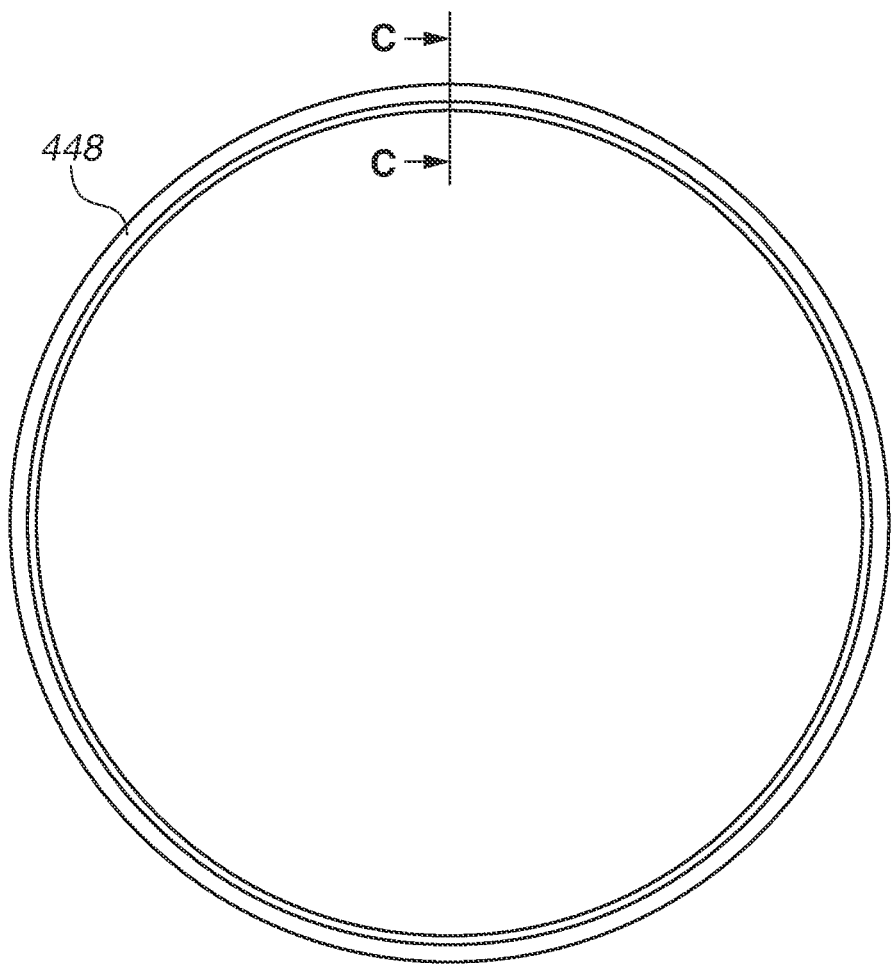
FIG. 5 is a diagram illustrating a washer according to a second exemplary embodiment.
Figure 6:
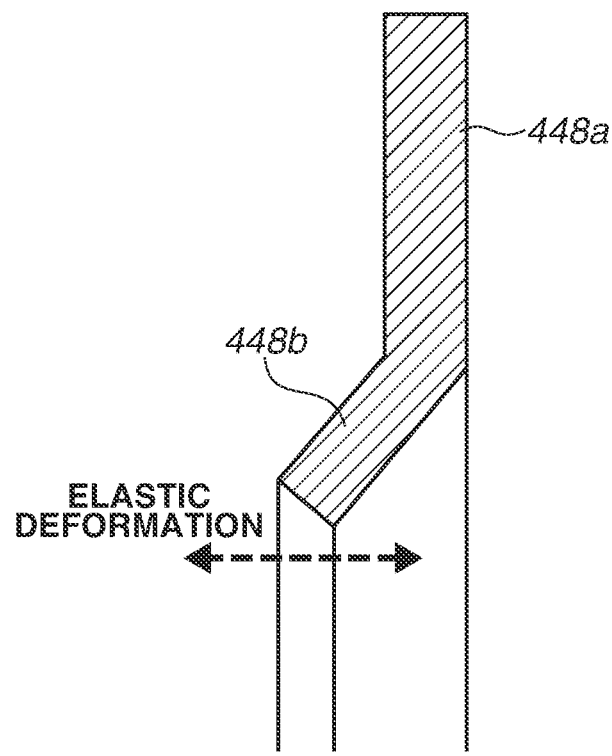
FIG. 6 is a sectional view taken along the line C-C illustrated in FIG. 5.

FIG. 5 is a diagram illustrating the washer 448 according to the present exemplary embodiment. FIG. 6 is a diagram illustrating a cross section taken along the line C-C illustrated in FIG. 5. The washer 448 includes a flat portion 448a and a biasing shape portion (elastically deformable portion) 448b. The biasing shape portion 448b is elastically deformable in the direction of the arrow illustrated by the dotted line in FIG. 6 with respect to the flat portion 448a. If the washer 448 is held by the fourth lens holding frame 241 and the retaining ring 242, the biasing shape portion 448b is deformed and the flat portion 448a is brought into contact with the retaining ring 242. This suppresses a change in the position of the washer 448 in the optical axis direction, and the washer 448 can be stably held.

The washer 448 has a size similar to that of the washer 228 according to the foregoing first exemplary embodiment, and is similarly arranged inside the base frame 243. Consequently, the lens apparatus according to the present exemplary embodiment can also suppress the inflow of the adhesive applied in the optical axis direction into the interior of lens apparatus.

[Modifications]

While the exemplary embodiments have been described above, the present disclosure is not limited to such exemplary embodiments. Various modifications and changes may be made without departing from the gist of the present disclosure.

For example, in the foregoing exemplary embodiments, the washer 248 or 448 is held on the fourth lens holding frame 241 by using the retaining ring 242 for holding the fourth-b sub lens unit L4b. However, the retaining ring 242 may be used as a member solely intended to hold the washer 248 or 448.

In the foregoing exemplary embodiments, the washer 248 or 448 is described to be used in the fourth lens unit holding structure. However, the washer 248 or 448 may be used for other lens unit holding structures.

The washers 248 and 448 have a circular shape which is circumferentially continuous when seen in the optical axis direction. However, the washers 248 and 448 may have a partially discontinuous C-shape. In such a case, the outflow of the adhesive can be suppressed by bonding the retaining ring 242 and the base frame 243 at portions other than where the washer is discontinuous.

The washers 248 and 448 are shaped like a plate member having a small dimension in the optical axis direction compared to the width between the inner and outer diameters. Alternatively, the washers 248 and 448 may have a cylindrical shape having a greater dimension in the optical axis direction than the width between the inner and outer diameters.

A lens apparatus including no adjustment unit for optical adjustments may include the washer 248 to suppress the inflow of an adhesive into the interior of the lens apparatus as in the foregoing exemplary embodiments.

In the foregoing exemplary embodiments, the retaining ring (holding member) 242 holding the fourth lens holding frame 241 is fixed to the base frame 243 by the adhesive 250. However, the fourth lens holding frame 241 may be directly fixed to the base frame 243 by the adhesive 250 without the retaining ring 242.

The lens units and the sub lens units in the foregoing exemplary embodiments may each include a single lens or a plurality of lenses.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-075085, filed Apr. 9, 2018, which is hereby incorporated by reference herein in its entirety.

What is claimed is:

1. A lens apparatus comprising:
   a first holding member configured to hold a lens unit;
   a base member including an adhesive holding portion opened in an optical axis direction of the lens unit to hold an adhesive, the base member being provided on an outer periphery side of the first holding member;
   an annular member arranged inside the base member to protrude at least in part from a position corresponding to an outer peripheral surface of the first holding member toward an inner peripheral surface of the base member and arranged to surround an optical axis;
   a second holding member configured to hold the first holding member; and
   an adjustment unit configured to adjust at least either one of a relative position and orientation of the first holding member with respect to the base member,
   wherein the annular member is a different member from the first holding member, and is sandwiched and fixed between the first holding member and the second holding member,
   wherein the base member and the second holding member are bonded by the adhesive, and
   wherein the annular member is configured to suppress the adhesive from flowing into an interior of the base member.

2. The lens apparatus according to claim 1, wherein at least part of an outer peripheral surface of the annular member is in contact with the inner peripheral surface of the base member.

3. The lens apparatus according to claim 1, wherein the annular member is fitted on the inner peripheral surface of the base member.

4. The lens apparatus according to claim 1, further comprising a biasing member configured to bias the annular member.

5. The lens apparatus according to claim 1,
wherein the annular member includes a flat portion and an elastically deformable portion, and
wherein the flat portion is biased by the elastically deformable portion.

6. The lens apparatus according to claim 1, wherein the lens apparatus is configured to satisfy $$R\max \leq G,$$

where Rmax is a maximum amount of adjustment to a position of the first holding member by the adjustment unit, and G is a size of a gap between an inner peripheral portion of the annular member and an outer peripheral portion of the first holding member in a radial direction of the annular member.

7. The lens apparatus according to claim 1, wherein the lens apparatus is configured to satisfy $$Dw + 2 \times R\max < Db,$$

where Rmax is a maximum amount of adjustment to a position of the first holding member by the adjustment unit, Db is an outermost diameter of the first holding member, and Dw is an inner diameter of the annular member.

8. An optical apparatus comprising:
a lens apparatus; and
a camera body including an image sensor, the lens apparatus being detachably attachable to the camera body,
wherein the lens apparatus includes:
a first holding member configured to hold a lens unit;
a base member including an adhesive holding portion opened in an optical axis direction of the lens unit to hold an adhesive, the base member being provided on an outer periphery side of the first holding member;
an annular member arranged inside the base member to protrude at least in part from a position corresponding to an outer peripheral surface of the first holding member toward an inner peripheral surface of the base member and arranged to surround an optical axis;
a second holding member configured to hold the first holding member; and
an adjustment unit configured to adjust at least either one of a relative position and orientation of the first holding member with respect to the base member,
wherein the annular member is held by the first holding member and the second holding member,
wherein the base member and the second holding member are bonded by the adhesive, and
wherein the annular member is configured to suppress the adhesive from flowing into an interior of the base member.

9. An optical apparatus comprising:
a lens apparatus; and
a camera body including an image sensor, the camera body being configured integrally with the lens apparatus,
wherein the lens apparatus includes:
a first holding member configured to hold a lens unit;
a base member including an adhesive holding portion opened in an optical axis direction of the lens unit to hold an adhesive, the base member being provided on an outer periphery side of the first holding member;
an annular member arranged inside the base member to protrude at least in part from a position corresponding to an outer peripheral surface of the first holding member toward an inner peripheral surface of the base member and arranged to surround an optical;
a second holding member configured to hold the first holding member; and
an adjustment unit configured to adjust at least either one of a relative position and orientation of the first holding member with respect to the base member,
wherein the annular member is held by the first holding member and the second holding member,
wherein the base member and the second holding member are bonded by the adhesive, and
wherein the annular member is configured to suppress the adhesive from flowing into an interior of the base member.

\* \* \* \* \*